United States Patent [19]

Shimizu

[11] Patent Number: 4,783,626
[45] Date of Patent: Nov. 8, 1988

[54] DISPLACEMENT DETECTOR WITH THREE SECONDARY COILS, ONE OF WHICH PROVIDES A CONSTANT BIAS OUTPUT

[75] Inventor: Yasuo Shimizu, Saitama, Japan

[73] Assignee: Honda Giken Kogyo Kabushiki Kaisha, Tokyo, Japan

[21] Appl. No.: 27,590

[22] Filed: Mar. 18, 1987

[30] Foreign Application Priority Data

Mar. 18, 1986 [JP] Japan .................. 61-59816

[51] Int. Cl.⁴ .................. G01B 7/14; G08C 19/08; B62D 5/04
[52] U.S. Cl. .................. 324/208; 73/862.33; 180/79.1; 318/657; 336/130; 340/870.36
[58] Field of Search .................. 324/207, 208, 225; 336/130, 136; 318/656–661; 340/870.35, 870.36; 73/862.33, 862.34, 862.36, 862.64, 862.68, 862.69; 180/79.1, 141, 142

[56] References Cited

U.S. PATENT DOCUMENTS

| | | | |
|---|---|---|---|
| 2,564,221 | 8/1951 | Hornfeck | 318/657 X |
| 3,181,055 | 4/1965 | Bischof | 336/130 X |
| 3,225,289 | 12/1965 | Koppel et al. | 340/870.35 X |
| 3,441,834 | 4/1969 | Moskowitz et al. | 340/870.35 X |
| 3,555,405 | 1/1971 | Martin | 340/870.35 X |
| 3,573,494 | 4/1971 | Houpt et al. | 340/870.35 X |
| 4,437,531 | 3/1984 | Urabe | 180/79.1 |
| 4,455,555 | 6/1984 | Symonds et al. | 340/870.36 X |
| 4,678,991 | 7/1987 | Schmidt | 324/208 X |

Primary Examiner—Gerard R. Strecker
Attorney, Agent, or Firm—Lyon & Lyon

[57] ABSTRACT

A displacement detector includes a movable member of a magnetic material movable as a function of the displacement of an object which is to be detected, an AC signal source, a primary coil energizable by an AC signal supplied by the AC signal source for generating a magnetic field in the direction in which the movable member is movable, secondary coils located in at least two positions spaced along and disposed around the path of movement of the movable member, a third coil disposed in the range of movement of the movable member and around the path of movement of the movable member, first, second, and third rectifier circuits connected respectively to the secondary coils and the third coils, and a processing circuit for processing outputs supplied from the first, second, and third rectifier circuits. The displacement detector can be incorporated in an automotive power steering device having input and output shafts coaxially coupled to each other by a resilient member which is twistable about its own axis.

11 Claims, 5 Drawing Sheets

DISPLACEMENT DETECTOR WITH THREE SECONDARY COILS, ONE OF WHICH PROVIDES A CONSTANT BIAS OUTPUT

BACKGROUND OF THE INVENTION

1. Field of the Invention

The present invention relates generally to a displacement detector, and more particularly to a displacement detector for detecting the displacement of an object by detecting a magnetic field which varies as a movable member moves with the displacement of the object.

2. Description of the Prior Art

One conventional displacement detector for detecting the displacement (which may include rotary motion) of an object by detecting a magnetic field which varies as a function of the movement of a movable member caused by the displacement of the object, is basically constructed as shown in FIG. 6(a) of the accompanying drawings.

The displacement detector shown in FIG. 6(a) comprises a bobbin 20 made of an insulating material, a movable member 200 of a magnetic material disposed in the bobbin 20 and vertically movable as a function of the displacement of an object (not shown), a primary coil 210 connected to a signal generator 10 and wound around the bobbin 20, and two secondary coils 220a, 220b connected respectively to rectifier circuits 30, 40 and wound around the bobbin 20 at positions spaced in the direction in which the movable member 200 is movable in the bobbin 20.

The rectifier circuits 30, 40 respectively have rectifying diodes 310, 410 connected in series with the secondary coils 220a, 220b, respectively, smoothing capacitors 320, 420 connected in parallel to the secondary coils 220a, 220b, respectively, resistors 330, 430 connected in parallel to the secondary coils 220a, 220b, respectively, and output terminals 80, 90. The secondary coils 220a, 220b have negative terminals 30b, 40b coupled in common to a ground potential 100.

Operation of the displacement detector will be described with reference to FIG. 6(b).

It is assumed that the secondary coils 220a, 220i b are wound in the same direction. Under a magnetic field generated by the primary coil 210 energized by an AC signal applied by the signal generator 10, the movable member 200 is moved toward one of the secondary coils, e.g., the coil 220a, and the other secondary coil 220b produces a counter electromotive force tending to prevent such movement of the movable member 200. At this time, currents flow in opposite directions through the secondary coils 220a, 220b. Assuming that the upward movement (in FIG. 6(a)) of the movable member 200 is positive (+) displacement and the downward movement thereof is negative (−) displacement, the output terminals 80, 90 produce respective output signals a, b as shown in FIG. 6(b) in response to the displacement D of the movable member 200. More specifically, when the movable member 200 is displaced in the positive (+) direction, the rectified output a is increased, whereas the rectified output b is reduced. Conversely, when the movable member 200 is displaced in the negative (−) direction, the rectified output a is reduced, whereas the rectified output b is increased. Therefore, the absolute value of the difference between the rectified outputs a, b indicates the magnitude of the displacement of the movable member 200, and the sign of the difference indicates the direction of the displacement. Half of the sum of the rectified outputs a, b. i.e., (a+b)/2, is of a constant value A1 at all times, and coincides with the cross-over point of the curves a, b.

For obtaining a large detected signal from the displacement detector shown in FIG. 6(a), it is preferable in general that the difference (a−b) between the rectified outputs be large, and that the average value of the output voltage (corresponding to the voltage at the point A1 where the displacement is 0) be of a certain small value so as to allow easy connection to a control circuit at a next stage. Where the difference (a−b) between the rectified outputs is large, the S/N ratio is high and highly reliable signal control is made possible. If the average value A1 of the output voltage is about 2.5V, then the output voltage of the differential displacement detector can directly be applied to a control circuit such as a microcomputer at a next stage, without requiring any transformation therebetween.

U.S. Pat. No. 4,437,531, for example, discloses a modified design of the above displacement detector, wherein the angular displacement of an input shaft (object with its displacement to be detected) with respect to an output shaft of an automotive power steering system is detected by detecting a magnetic field which varies as a movable member is moved in response to the displacement (rotation) of the intput shaft. In this modified displacement detector, the rectified outputs from two secondary coils are applied to a differential amplifier, which amplifies the difference between the applied outputs and supplies the same to a next control circuit.

If the conventional displacement detector such as shown in FIG. 6(a) is used in an automotive power steering device and an amplifier is employed to increase the difference (a−b) between the rectified outputs as disclosed in U.S. Pat. No. 4,437,531, then the overall arrangement is complex, operation reliability thereof is lowered, and the cost is increased, because of an increased number of components. One way of increasing the difference (a−b) between the rectified outputs would be to increase the stroke that the movable member 200 can move. However, this would not be practical since the required space would be increased and the structural rigidity would be lowered. Alternatively, the difference (a−b) between the rectified outputs could be increased by increasing the number of turns of each of the coils 220a, 220b. With this alternative, the rectified output difference would be increased as indicated by curves c, d in FIG. 6(b), but the average output voltage would also be increased to a value A2, and hence the output voltage could not generally be used directly for subsequent signal processing.

SUMMARY OF THE INVENTION

In view of the aforesaid difficulties of the conventional displacement detectors, it is an object of the present invention to provide a differential displacement detector which can produce a larger differential voltage output and a lower average output voltage, and which is simple and highly reliable.

According to the present invention, there is provided a displacement detector comprising a movable member of a magnetic material movable as a function of the displacement of an object which is to be detected, an AC signal source, a primary coil energizable by an AC signal supplied by the AC signal source for generating a magnetic field in the direction in which the movable member is movable, secondary coils located in at least two positions spaced along and disposed around the path of movement of the movable member, a third coil disposed in the range of movement of the movable member and around the path of movement of the movable member, first, second, and third rectifier circuits connected respectively to the secondary coils and the third coil, and a processing circuit for processing outputs supplied from the first, second, and third rectifier circuits.

Each of the first and second rectifier circuits includes a rectifying element connected in series with one of the secondary coils, and a capacitor and a resistor which are connected in parallel to the secondary coil. The third rectifier circuit includes a rectifying element connected in series with the third coil, and a capacitor and a variable resistor which are connected in parallel to the third coil. The processing circuit includes first and second output terminals and portions of the first, second, and third rectifier circuits.

The displacement detector of the invention can be employed in an automotive power steering device having intput and output shafts coaxially coupled to each other by a resilient member which is twistable about its own axis.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
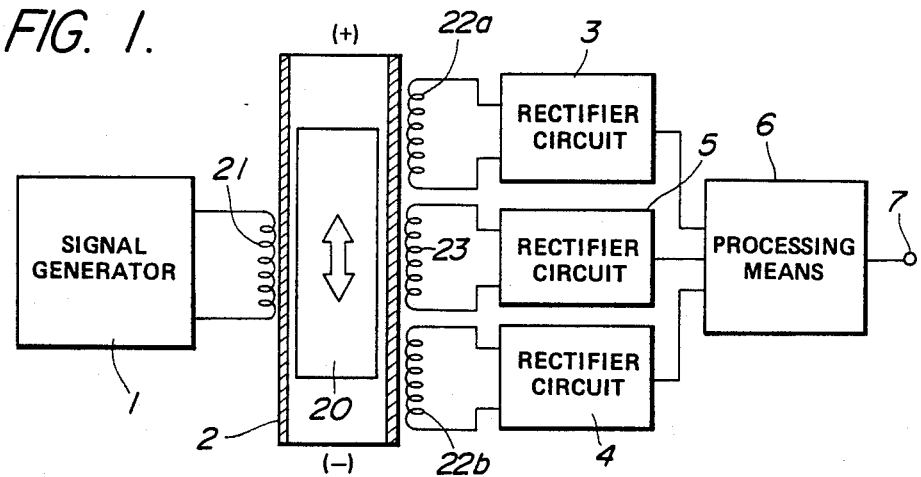
FIG. 1 is a block diagram showing the basic concept of a displacement detector according to the present invention.

As shown in FIG. 1, a displacement detector of the present invention basically includes a cylindrical bobbin 2 made of an insulating material, a movable member of a magnetic material disposed in the bobbin 2 and vertically movable as a function of the displacement (which may include rotary motion) of an object (not shown), a signal generator 1, a primary coil 21 connected to the signal generator 1 and wound around the bobbin 2, at least two secondary coils 22a, 22b wound in spaced relation on the bobbin 2, the secondary coils 22a, 22b being located in different positions spaced along the path of movement of the movable member 20 and disposed around the path of movement of the movable member 20, a third coil 23 wound around the bobbin 2 for detecting, through the movable member 20, a magnetic field generated by the primary coil 21 irrespective of movement of the movable member 20, rectifier circuits 3, 4, 5 connected respectively to the coils 22a, 22b, 23, and a processing means 6 receptive of outputs from the rectifier circuits 3, 4, 5 for processing these outputs and producing a processed output through an output terminal 7.

The third coil 23 on the bobbin 2 is disposed around a portion of the path of movement of the movable member 20. The third coil 23 may be of any design insofar as it can detect, through the movable member 20, a magnetic field which is developed by the primary coil 21, irrespective of the movement of the movable member 20.

The primary coil 21, the secondary coils 22a, 22b, and the third coil 23 jointly constitute a magnetic circuit. In the magnetic circuit, the third coil 23 has substantially the same number of turns as that of each of the secondary roils 22a, 22b, and the coils 23, 22a, 22b are wound in the same direction.

With the above circuit arrangement, a bias voltage produced by the third coil 23 through the rectifier circuit 5 is processed at all times with output voltages produced by the secondary coils 22a, 22b through the rectifier circuits 3, 4. Therefore, the output voltage per unit of displacement, that is, the gradient of an output voltage characteristic curve, can be increased by increasing the number of turns of the secondary coils. Furthermore, the crossover voltage can be lowered so that the output voltage can directly be applied to a subsequent control circuit.

Various embodiments of the present invention based on the basic concept described above will be described below. Identical parts are denoted by identical reference characters throughout views including FIG. 1.

1st Embodiment

Figure 2A:
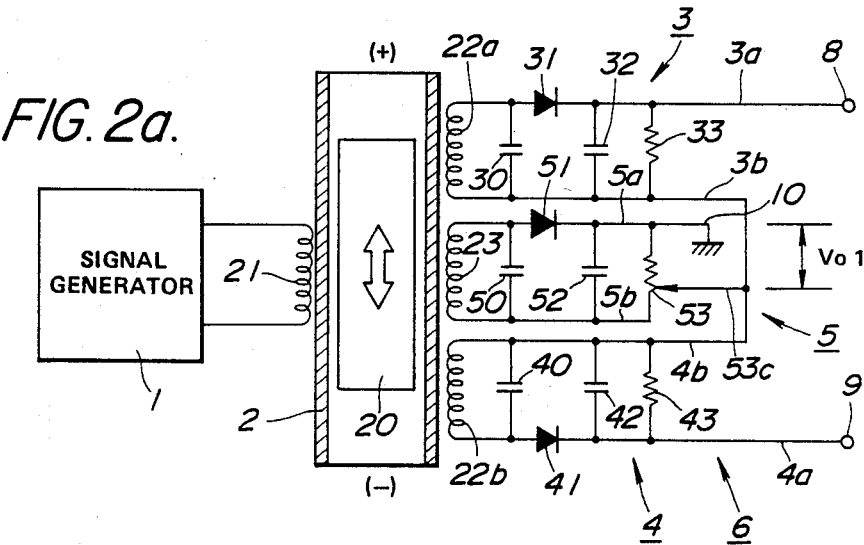
FIG. 2(a) is a circuit diagram of a displacement detector according to a first embodiment of the present invention.

FIG. 2(a) shows a displacement detector according to a first embodiment of the present invention.

According to the first embodiment, the magnetic circuit comprised of the primary coil 21, the secondary coils 22a, 22b, and the third coil 23 is identical to that shown in FIG. 1. The rectifier circuits 3, 4, 5 respectively include rectifying diodes 31, 41, 51, smoothing capacitors 30, 32; 40, 42; 50, 52, and resistors 33, 43, 53. The processing circuit 6 includes output terminals 8, 9 and portions of the rectifier circuits 3, 4, 5. The resistor 53 is a variable resistor or rheostat.

The rectifier circuit 3 for rectifying the output from the secondary coil 22a has a positive terminal or line 3a connected to the output terminal 8, and a negative terminal or line 3b connected to a movable contact 53c of the variable resistor 53 of the rectifier circuit 5. The rectifier circuit 4 for rectifying the output from the secondary coil 22b has a negative terminal or line 4b connected to the movable contact 53c of the variable resistor 53 and a positive terminal or line 4a connected to the output terminal 9. The rectifier circuit 5 for rectifying the output from the third coil 23 has positive and negative terminals or lines 5a, 5b connected to both ends, respectively, of the variable resistor 53, the positive line 5a being also coupled to a ground potential 10.

When the signal generator 1 serving as a source of a drive signal is operated to energize the primary coil 21, currents are induced through the secondary coils 22a, 22b dependent on vertical movement of the movable member 20 in the bobbin 2 under the magnetic field produced by the primary coil 21. Similarly, a current is induced through the third coil 23. This induced current on the third coil 23 remains substantially constant irrespective of the movement of the movable member 20, and develops a constant voltage Vol between the ground 10 and the movable contact 53c.

The voltage Vol is added by the processing circuit 6 to the outputs of the rectifier circuits 3, 4 such that the voltage Vol serves to reduce the voltages a, b issued from the output terminals 8, 9.

Figure 2B:
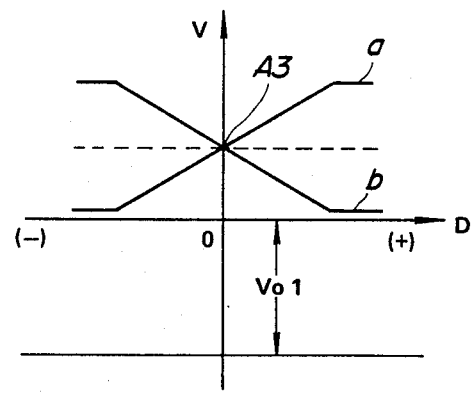
FIG. 2(b) is a graph showing outputs of the displacement detector of the first embodiment.

Assuming that the upward movement (in FIG. 2) of the movable member 20 is positive (+) displacement and the downward movement thereof is negative (−) displacement, the output terminals 8, 9 produce respective output signals a, b as shown in FIG. 2(b) in response to the displacement D of the movable member 20. More specifically, when the movable member 20 is displaced in the positive (+) direction, the rectified output a is increased, whereas the rectified output b is reduced. Conversely, when the movable member 20 is displaced in the negative (−) direction, the rectified output a is reduced, whereas the rectified output b is increased. Therefore, the crossover voltage of the rectified outputs a, b is A3 because of the voltage Vol, so that the difference between the rectified outputs a, b is of a large magnitude while the absolute average voltage value remains low.

The processing circuit 6 of the displacement detector of the invention is partly constructed of components of the rectifier circuits 3, 4, 5.

2nd Embodiment

Figure 3A:
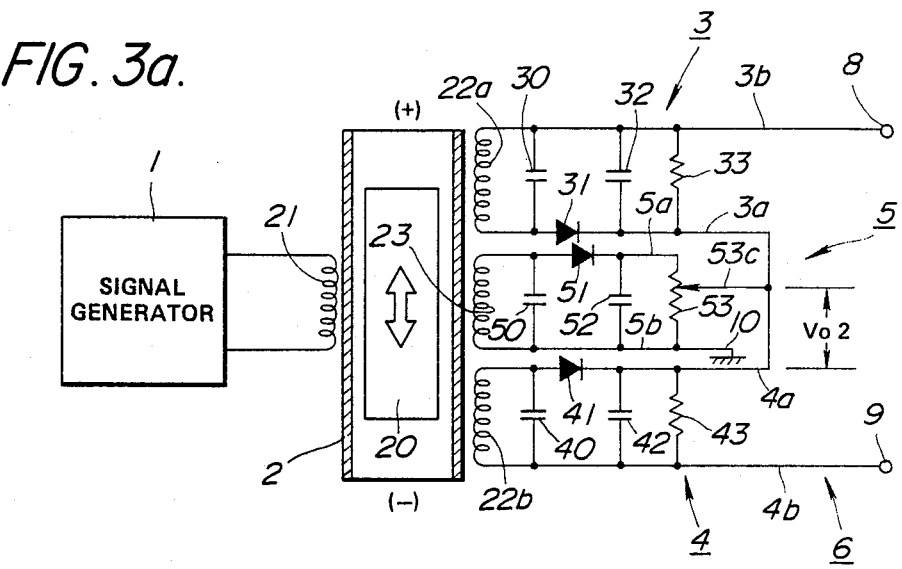
FIG. 3(a) is a circuit diagram of a displacement detector according to a second embodiment of the present invention.

FIG. 3(a) shows a displacement detector according to a second embodiment of the present invention.

According to the second embodiment, the magnetic circuit comprised of the primary coil 21, the secondary coils 22a, 22b, and the third coil 23 is identical to that shown in FIG. 1. The rectifier circuits 3, 4, 5 respectively include rectifying diodes 31, 41, 51, smoothing capacitors 30, 32; 40, 42; 50, 52, and resistors 33, 43, 53. The processing circuit 6 includes output terminals 8, 9 and portions of the rectifier circuits 3, 4, 5. The resistor 53 is a variable resistor or rheostat.

The rectifier circuit 3 for rectifying the output from the secondary coil 22a has a negative terminal or line 3b connected to the output terminal 8, and a positive terminal or line 3a connected to a movable contact 53c of the variable resistor 53 of the rectifier circuit 5. The rectifier circuit 4 for rectifying the output from the secondary coil 22b has a positive terminal or line 4a connected to the movable contact 53c of the variable resistor 53 and a negative terminal or line 4b connected to the output terminal 9. The rectifier circuit 5 for rectifying the output from the third coil 23 has positive and negative terminals or lines 5a, 5b connected to both ends, respectively, of the variable resistor 53, the negative line 5b being also coupled to a ground potential 10.

Figure 3B:
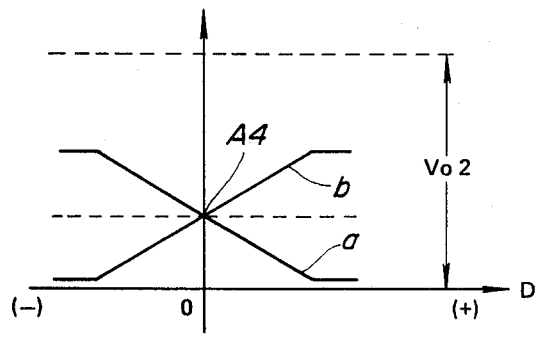
FIG. 3(b) is a graph showing outputs of the displacement detector of the second embodiment.

In the second embodiment shown in FIG. 3(a), the polarity of the output from the third coil 23 through the rectifier circuit 5 with respect to the outputs from the secondary coils 22a, 22b through the rectifier circuits 3, 4 is opposite to that shown in FIG. 2(a). The outputs from the rectifier circuits 3, 4, 5 are shown in FIG. 3(b) in which a voltage Vo2 produced by the third coil 23 is a bias voltage like the bias voltage Vol in FIG. 2(b).

3rd Embodiment

Figure 4A:
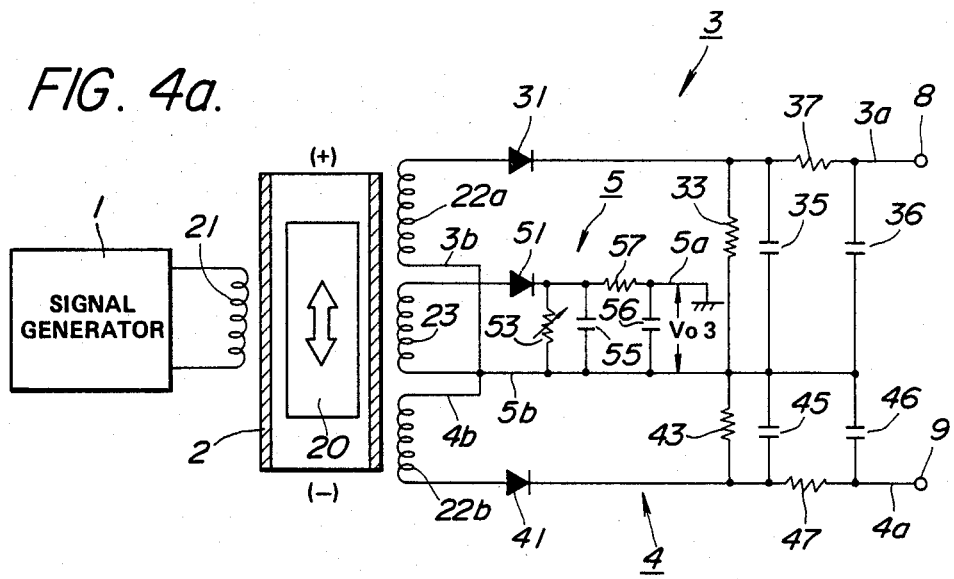
FIG. 4(a) is a circuit diagram of a displacement detector according to a third embodiment of the present invention.

FIG. 4(a) shows a displacement detector according to a third embodiment of the present invention.

According to the second embodiment, the magnetic circuit comprised of the primary coil 21, the secondary coils 22a, 22b, and the third coil 23 is identical to that shown in FIG. 1. The rectifier circuits 3, 4, 5 respectively include rectifying diodes 31, 41, 51, smoothing capacitors 35, 36; 45, 46; 55, 56, and resistors 33, 43, 53. The processing circuit 6 includes output terminals 8, 9 and portions of the rectifier circuits 3, 4, 5. The resistor 53 is a variable resistor or rheostat. The rectifier circuit 5 has a positive terminal or line 5a grounded.

In the third embodiment, the rectifier circuits 3, 4, 5 also include resistors 37, 47, 57, respectively, connected between ends of the paired capacitors 35, 36; 45, 46; 55, 56. The other ends of the paired capacitors 35, 36; 45, 46; 55, 56 are connected in common to a negative terminal or line 5b which is opposite to the ground potential or positive line 5a of the third coil 23. Thus, the negative lines 3b, 4b of the rectifier circuits 3, 4 are the same as the negative line 5b of the rectifier circuit 5.

Figure 4B:
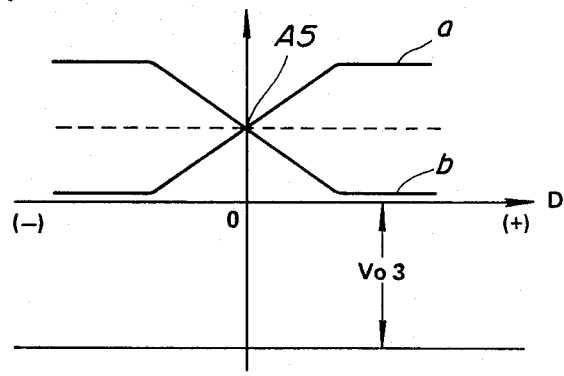
FIG. 4(b) is a graph showing outputs of the displacement detector of the third embodiment.

With the circuit arrangement of FIG. 4(a), the secondary coils 22a, 22b are directly connected to the third coil 23, and the outputs from the interconnected coils 22a, 22b, 23 are rectified. The outputs shown in FIG. 4(b) are similar to those shown in FIG. 2(b). The voltage produced by the third coil 23 serves as a bias voltage Vo3, and the crossover voltage of the outputs a, b is indicated by A5.

4th Embodiment

Figure 5:
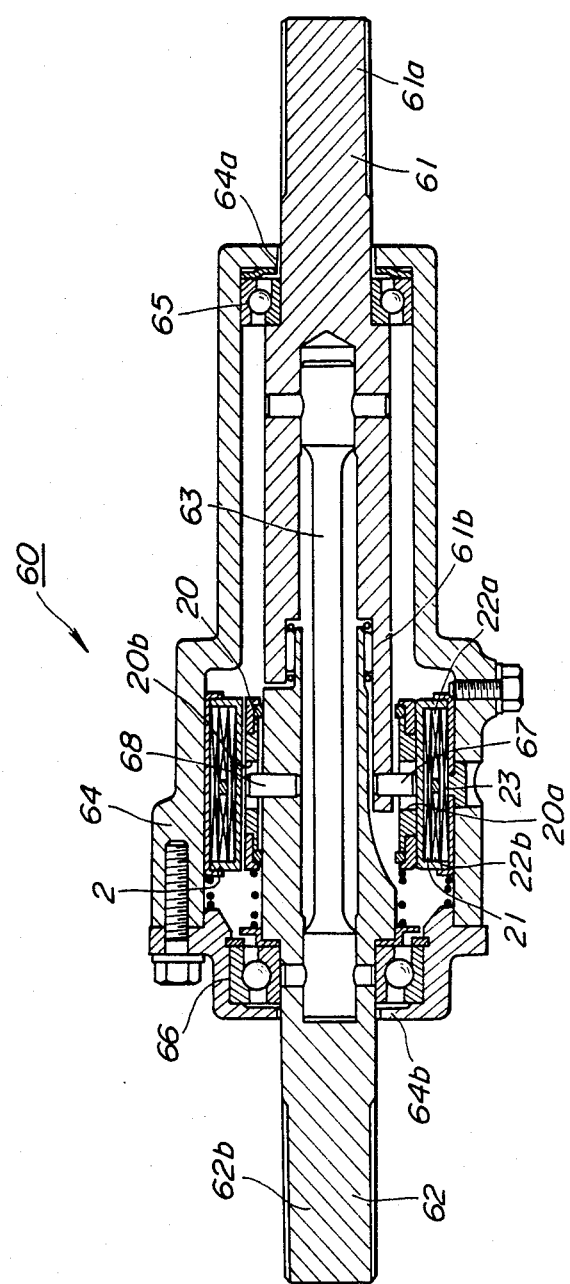
FIG. 5 is a cross-sectional view of a displacement detector according to a fourth embodiment, as incorporated in an automotive power steering device.
Figure 6A:
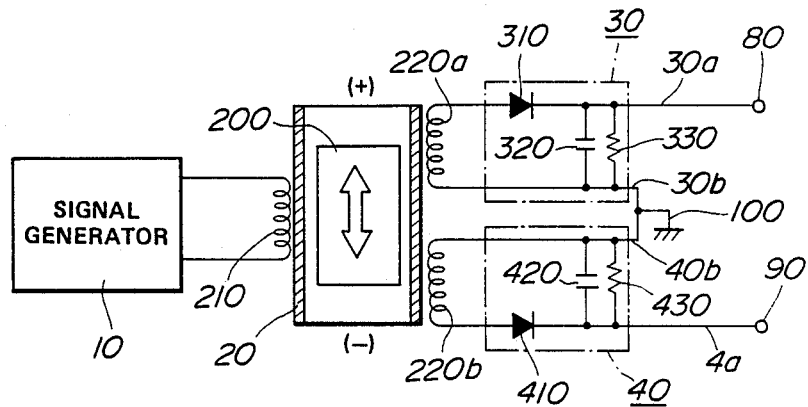
FIG. 6(a) is a circuit diagram of a conventional displacement detector.
Figure 6B:
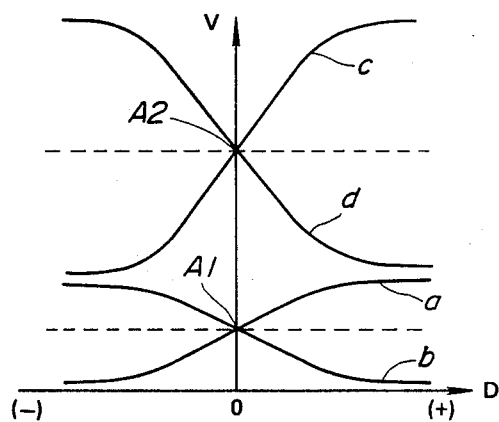
FIG. 6(b) is a graph showing outputs of the conventional displacement detector.

FIG. 5 shows a displacement detector according to a fourth embodiment, as incorporated in a motor-driven power steering device for an automobile.

The motor-driven power steering device, which is only partly shown in FIG. 5, includes an input shaft 61 and an output shaft 62 operatively coupled thereto for transmitting steering motion. Various components of the power steering device, such as a steering rotation detector for detecting the rotational speed of the input shaft 61, an electric motor for generating assistive torque required upon rotation of the input shaft 61, a speed reducer mechanism for transmitting the generated assistive torque at a desired rotational speed to the output shaft 62, a control unit for controlling the electric motor based on detected signals from the steering rotation detector and a steering torque detector, and a power supply for the control unit, are omitted from illustration in FIG. 5.

A displacement detector, which may be either one of the displacement detectors shown in FIGS. 2 through 4, is coupled as a steering torque detector 60 to the input and output shafts 61, 62. The input shaft 61 has an end portion fitted over an end portion of the output shaft 62, and is operatively coupled to the output shaft 62 by a torsion bar 63 which is twistable about its own axis. The input and output shafts 61, 62 thus coaxially interconnected by the torsion bar 63 are rotatably supported by respective bearings 65, 66 disposed within a casing 64 at its opposite open ends 64a, 64b, the casing 64 being fixed to an automobile body. The input shaft 61 has an output end 61b from which two pins 67 angularly spaced 180° from each other project radially outwardly. The output shaft 62 has an input end from which two pins 68 angularly spaced 180° from each other project radially outwardly, the pins 68 being angularly spaced 90° from the pins 67. The 90°-spaced pins 67, 68 engage in slots 20a, 20b defined in the peripheral side of a cylindrical movable core 20 made of a magnetic material. The slots 20a of the movable core 20 are inclined at an angle to the axis of the movable core 20, whereas the slots 20b extend parallel to the axis of the movable core 20. Therefore, when the input shaft 61 is rotated about its own axis by steering operation, the angular spacing between the pins 67, 68 is allowed by the torsion bar 63 to vary from 90°, moving the movable core 20 in the axial direction. For example, when the steering direction is toward the right, the movable core 20 is moved to the left (FIG. 5). When the steering direction is toward the left, the movable core 20 is moved to the right. Therefore, the steering torque which is proportional to the amount of twisting the torsion bar 63 corresponds to the axial displacement of the movable core 20.

The coil bobbin 2 is fixedly mounted in the case 64 in surrounding relation to the movable core 20. The primary coil 21, the secondary coils 22a, 22b, and the third coil 23 are uniformly wound in the coil bobbin 2 coaxially with the input shaft 61 and hence the output shaft 62. The primary winding 21 is wound over substantially the entire length of the movable core 20 in a position closest to the movable core 20. The secondary coils 22a, 22b are positioned radially outwardly of the primary coil 21 and axially spaced from each other. The third coil 23 is wound radially outwardly of the secondary coils 22a, 22b and has substantially the same number of turns as that of each of the secondary coils 22a, 22b. The third coil 23 is wound over substantially the entire length of the movable core 20.

When the input shaft 61 is rotated about its own axis, the movable core 20 is axially displaced to cause the secondary coils 22a, 22b to produce an output voltage proportional to the applied steering torque at their output terminals (or the output terminals of the third coil 23).

The input shaft 61 has an end 61a coupled to a steering shaft (not shown). The electric motor for generating assistive torque or the speed reducer mechanism is coupled to an end 62b of the output shaft 62.

More than two secondary coils may be employed dependent on the magnitude of a displacement to be detected and the desired mode of control. The displacement detector of the invention may be incorporated various other devices than automotive power steering devices.

With the arrangement of the present invention, the third coil is employed to add a bias voltage such that it can reduce the output voltages of the secondary coils. On account of such a bias voltage produced by the third coil, the difference between the output voltages of the secondary coils is increased, but the average output voltage (crossover voltage) is reduced.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

I claim:

1. A displacement detector comprising:
   a movable member of a magnetic material movable as a function of the displacement of an object which is to be detected;
   an AC signal source;
   a primary coil energizable by an AC signal supplied by said AC signal source for producing a magnetic field oriented along the path in which said movable member is movable;
   secondary coils located in at least two positions, respectively, spaced along and disposed around the path of movement of said movable member, whereby currents are inducted through said secondary coils dependent on the movement of said movable member under the magnetic field produced by said primary coil;
   a third coil located within a range of movement of said movable member, whereby a constant current is induced through said third coil irrespective of the movement of said movable member;
   first, second, and third rectifier circuits connected respectively to said secondary coils and said third coil, whereby the respective induced currents are rectified as the respective rectified outputs;
   a processing circuit for processing the respective rectified outputs supplied from said first and second rectifier circuits along with a rectified constant bias output supplied from said third rectifier circuit to provide an output signal indicative of the displacement of said object, wherein the difference between the respective rectified outputs is of a large magnitude while the absolute average value of said output signal is of a low magnitude.

2. A displacement detector according to claim 1, wherein each of said first and second rectifier circuits includes a rectifying element connected in series with one of said secondary coils, and a capacitor and a resistor which are connected in parallel to said secondary coil, said third rectifier circuit including a rectifying element connected in series with said third coil, and a capacitor and a variable resistor which are connected in parallel to said third coil, said processing circuit including first and second output terminals and portions of said first, second, and third rectifier circuits.

3. A displacement detector according to claim 2, wherein said first rectifier circuit also includes a positive terminal connected to said first output terminal and a negative terminal connected to a movable contact of said variable resistor, said second rectifier circuit also including a positive terminal connected to said second output terminal and a negative terminal connected to said movable contact, said third rectifier circuit also including a positive terminal connected to ground and to one end of said variable resistor and a negative terminal connected to the other end of said variable resistor.

4. A displacement detector according to claim 2, wherein said first rectifier circuit also includes a negative terminal connected to said first output terminal and a positive terminal connected to a movable contact of said variable resistor, said second rectifier circuit also including a negative terminal connected to said second output terminal and a positive terminal connected to said movable contact, said third rectifier circuit also including a positive terminal connected to one end of said variable resistor and a negative terminal connected to ground and to the other end of said variable resistor.

5. A displacement detector according to claim 2, wherein said third rectifier circuit also includes a positive terminal connected to ground and to one end of said variable resistor and a negative terminal connected to the other end of said variable resistor, said first rectifier circuit also including a positive terminal connected to said first output terminal and a negative terminal connected to said negative terminal of the third rectifier circuit, said second rectifier circuit also including a positive terminal connected to said second output terminal and a negative terminal connected to said negative terminal of the third rectifier circuit.

6. A displacement detector according to claim 5, wherein said third rectifier circuit also includes an additional resistor connected in series to said positive terminal thereof, said positive terminal of the third rectifier circuit being connected to ground through said additional resistor, said first rectifier circuit also including an additional resistor connected in series to said positive terminal thereof, said positive terminal of the first rectifier circuit being connected to said first output terminal through said additional resistor thereof, said second rectifier circuit also including an additional resistor connected in series to said positive terminal thereof, said positive terminal of the second rectifier circuit being connected to said second output terminal through said additional resistor thereof.

7. A displacement detector according to claim 1, wherein said third coil has substantially the same number of turns as that of each of said secondary coils and is wound in the same direction as each of said secondary coils.

8. A displacement detector according to claim 7, further including a bobbin of an insulating material, said primary coil being wound uniformly around said bobbin over the entire length of the bobbin, said secondary coils being wound around said primary coil and spaced from each other in the axial direction of said bobbin, said third coil being wound uniformly around said secondary coils over the entire length of the bobbin.

9. A displacement detector in a power steering device of an automobile having input and output shafts coaxially connected to each other through a resilient member that is twistable about its own axis, comprising:
a casing fixed to a body of the automobile, said input and output shafts having interconnected ends disposed in said casing and being rotatably supported in said casing by bearings;
a cyclindrical core axially movably fitted over the interconnected ends of said input and output shafts;
engaging means for engaging said cylindrical core to said input and output shafts and allowing said cylindrical core to be movable in response to twisting of said resilient member upon relative rotation of said input and output shafts;
a cylindrical bobbin of an insulating material fixedly mounted in said casing and disposed around the path of movement of said movable core substantially within the range of movement of said movable core;
a cylindrical bobbin housing;
a primary coil for magnetizing the inner space of the cylindrical bobbin;
secondary coils located in at least two positions, respectively, spaced along and disposed around the path movement of said movable member, whereby currents are inducted through said secondary coils dependent on the movement of said movable member under the magnetic field produced by said primary coil;
a third coil located within a range of movement of said movable member, whereby a constant current is induced through said third coil irrespective of the movement of said movable member;
a processing circuit arranged in said power steering device for processing respective rectified outputs supplied from said first and second rectifier circuits along with a rectified constant bias output supplied from said third rectifier circuit to provide an output signal indicative of the displacement of said object, wherein the difference between the respective rectified outputs is of a large magnitude while the absolute average value of said output signal is of a low magnitude.

10. A displacement detector according to claim 9, wherein said third coil has substantially the same number of turns as that of each of said secondary coils and is wound in the same direction as each of said secondary coils.

11. A displacement detector according to claim 10, wherein said primary coil is wound uniformly around said bobbin over the entire length of the bobbin, said secondary coils being wound around said primary coil and spaced from each other in the axial direction of said bobbin, said third coil being wound uniformly around said secondary coils over the entire length of the bobbin.

* * * * *